United States Patent [19]

Jagannathan et al.

[11] Patent Number: 5,430,839
[45] Date of Patent: Jul. 4, 1995

[54] DATA ENTRY SCREEN METHOD

[75] Inventors: Anand Jagannathan; Joy Chhugani, both of Sunnyvale, Calif.

[73] Assignee: Reach Software, Sunnyvale, Calif.

[21] Appl. No.: 166,734

[22] Filed: Dec. 14, 1993

Related U.S. Application Data

[63] Continuation of Ser. No. 646,883, Jan. 28, 1991, abandoned.

[51] Int. Cl.⁶ .............................................. G06F 3/153
[52] U.S. Cl. .................................................... 395/159
[58] Field of Search ............... 395/157, 158, 159, 155, 395/161, 156, 160, 119, 120

[56] References Cited

U.S. PATENT DOCUMENTS

| | | | |
|---|---|---|---|
| 4,862,389 | 8/1989 | Takagi | 364/521 |
| 5,101,365 | 3/1992 | Westbag et al. | 395/158 |
| 5,146,555 | 9/1992 | Kiyohara | 395/157 |
| 5,165,012 | 11/1992 | Crandall et al. | 395/100 |
| 5,175,813 | 12/1992 | Golding et al. | 395/157 |
| 5,179,655 | 1/1993 | Noguchi et al. | 395/158 |

*Primary Examiner*—Phu K. Nguyen

[57] ABSTRACT

A method for searching through a stack of windows displayed on a computer screen at the same time wherein each window is identified as being of a particular object type and each object type is associated with an icon that is continuously displayed on the screen in a palette window. Clicking on an icon cycles only the windows of that object type. A particular window is found and brought into display focus (to the top of the stack) by clicking on the icon associated with the object type of the window being sought until the window appears.

24 Claims, 3 Drawing Sheets

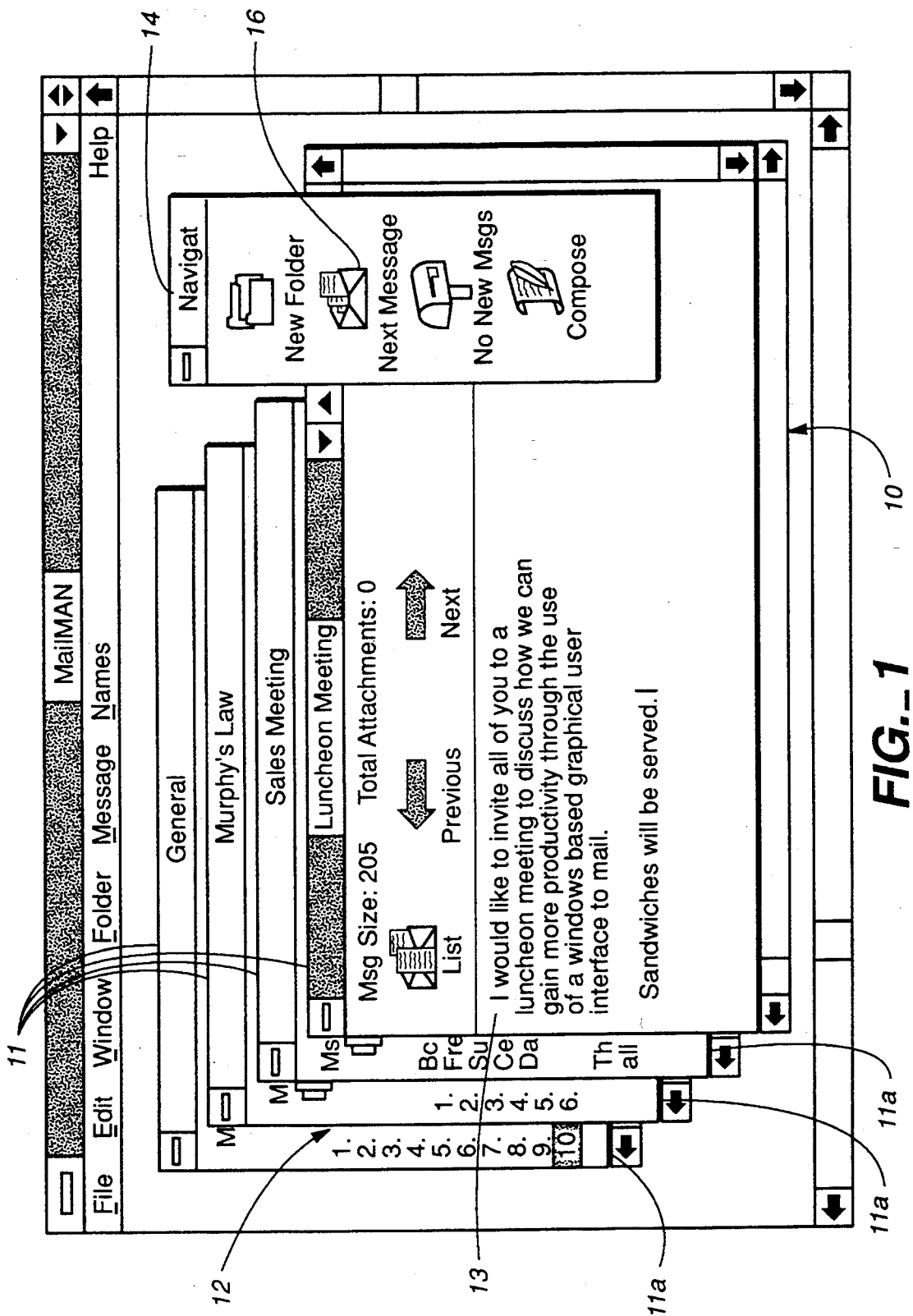
FIG._1

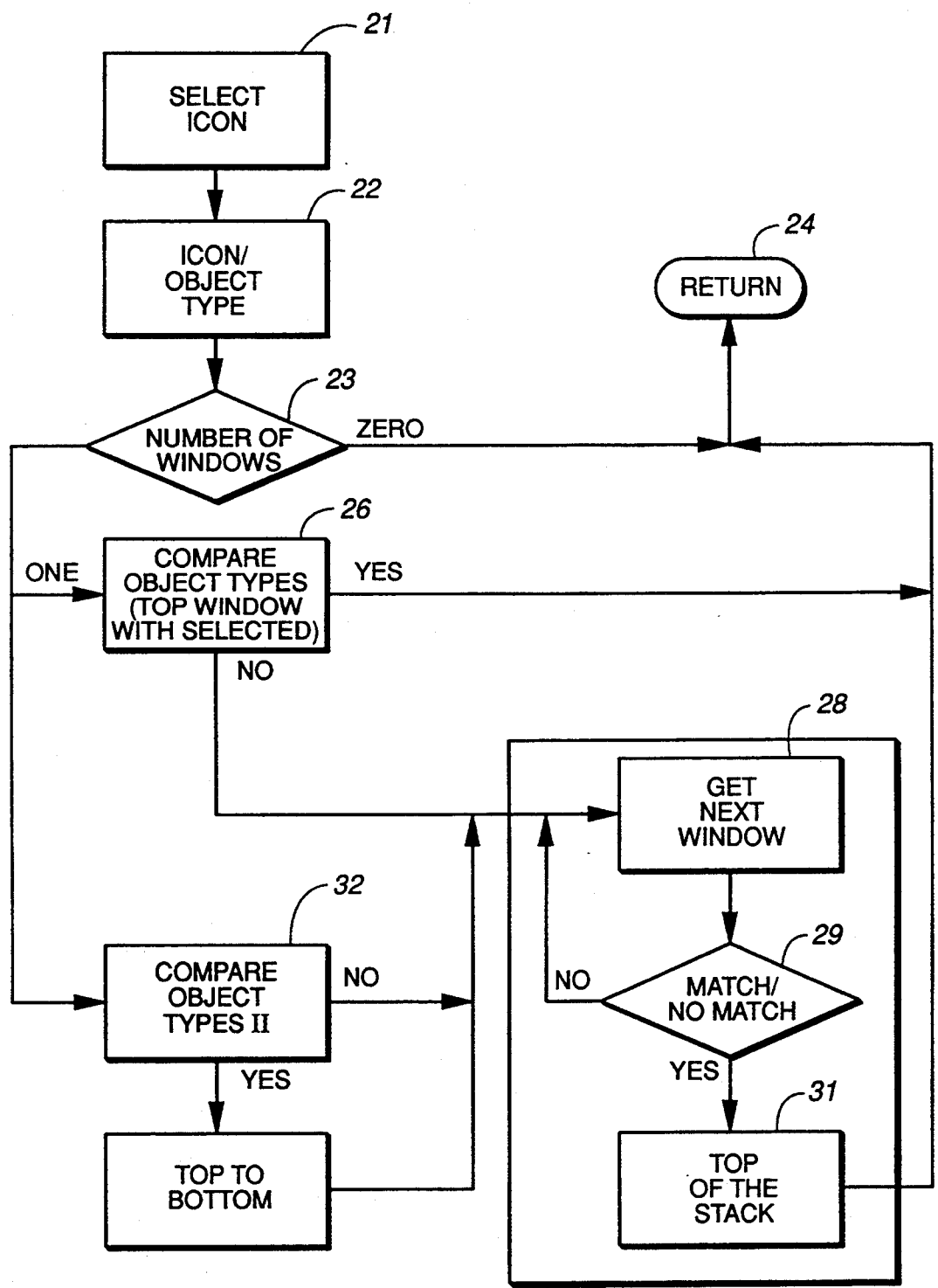
FIG._2

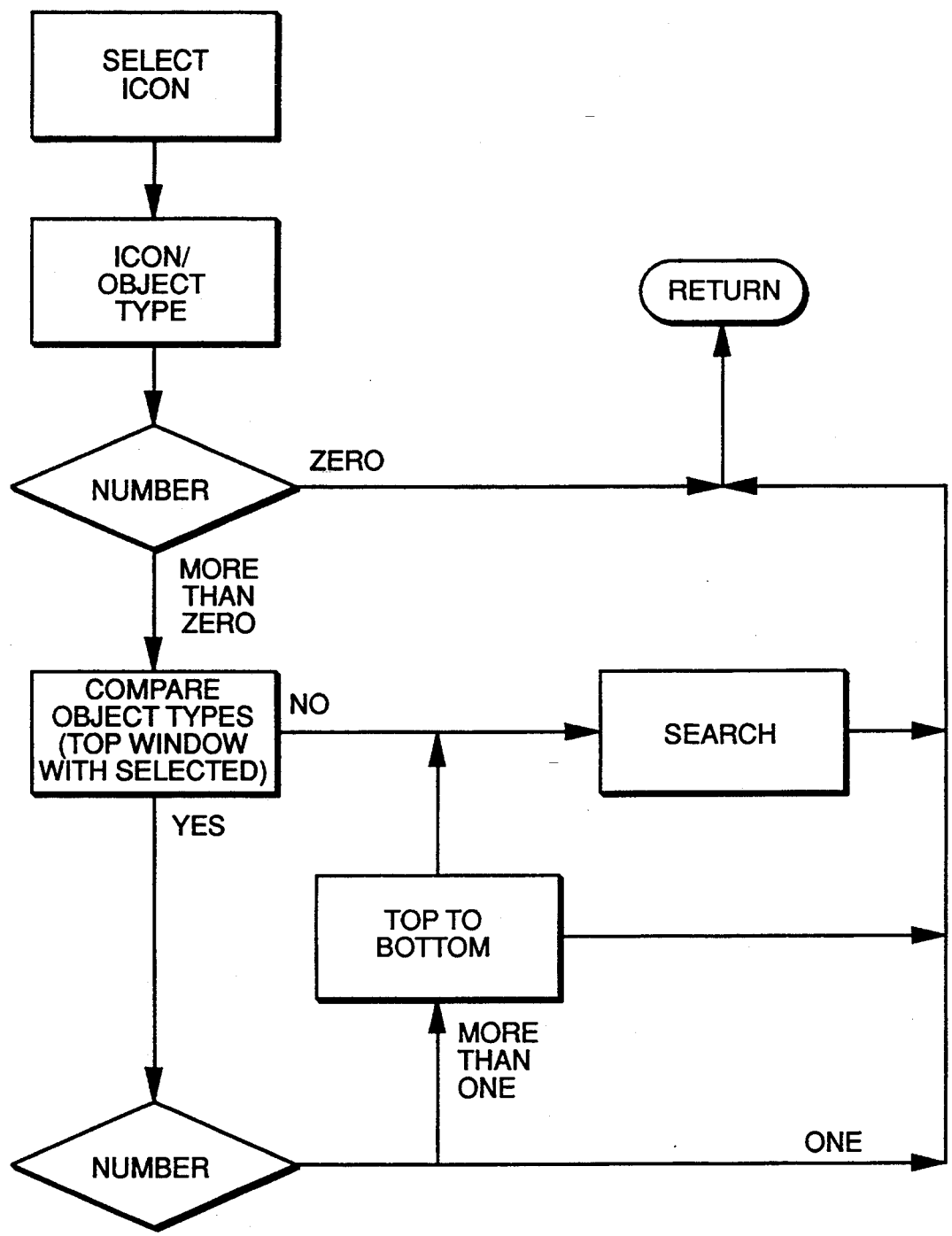
FIG._3

DATA ENTRY SCREEN METHOD

This is a continuation of application Ser. No. 07/646,883 filed on Jan. 28, 1991, now abandoned.

BACKGROUND OF THE INVENTION

This invention generally relates to computer/user interfaces and, more particularly, to a data entry screen method for use with a system that allows for display of multiple windows on the computer screen where each window displays data for an application or a portion of an application.

Windowed user interfaces have been used by a segment of the computer community for a number of years and are now becoming the design of choice of more and more application developers. The windowed user interface can be described by likening it to the basic elements of a non-electronic office: the file cabinet; the file folder; the document; and, the desk top or work surface.

In the traditional office, data is stored on pieces of paper that are organized according to some criteria (e.g., subject matter, date, type, etc) within file folders that are marked to identify their contents and in turn stored in file cabinets. In the course of a day many documents from a variety of folders from the file cabinet may find there way onto the desk top for use by the person working with the data. And many of these documents may be on the desk top at the same time. Organizing the documents on the desk top can save a lot of time when the need arises to locate data from a particular document.

In very much the same way, windowed user interface systems for computers allow numerous "documents" (called windows) to be brought up from the data storage media (i.e., hard disk, floppy disk, etc.) and displayed on the screen and remain there at the same time. Each window brought up has a data header associated with it which contains system maintained data about the window (e.g., size), as well as application data maintained by the application program (e.g., type of information to be displayed in the window). Some of the header data may be visually displayed on the screen and some will not be.

The displayed windows usually visually overlap one another on the computer screen, but there can be multiple windows in the foreground. In either event, however, there is only one window that has the "display focus" and is entirely displayed, and to which user input is directed. The numerous displayed windows can be thought of and visualized as a "stack" of documents with bits and pieces of the documents below the top document exposed but only the document on the top of the stack being fully exposed (not fully or partially covered by another document).

Since the only window available for user input is the one in display focus (on the top of the stack), it is necessary to bring a window to the top of the stack (into display focus) before data can be entered into, or extracted from it. In order to bring a hidden window into display focus, the user of the window system has to typically find the hidden window by moving around the windows displayed in the foreground until a portion of the sought after window is visible and then clicking (putting a mouse indicator on the icon and operating the appropriate activator) on that portion of the window to bring the entire window to the foreground and into display focus. Because it can be difficult and time consuming to find a particular window in this manner, a more efficient and convenient method for is desireable.

Systems known in the art provide some assistance in finding a window. One such system is found in Word Perfect Corporation's program for the Macintosh, Word Perfect 1.0.2, which provides a pull-down menu (a small window separate from the stack that can be temporarily activated upon command) that lists by title all of the windows in the stack on the screen and permits any listed window to be "selected" and thereby brought to the top of the stack (in display focus) and available for user input. The pull-down menu (or a preset key stoke) also allows the displayed windows to be cycled to the top of the stack one at a time. The major drawback of this system is that all of the windows in the stack must be cycled to find the desired window unless the user knows the title of the window being looked for. When the number of windows in the stack is more than a few, this method quickly becomes time consuming and unwieldy.

Apple Computer's MultiFinder program for the Macintosh permits a number of different application programs to be in memory at the same time (that is, it is not required that one application program be closed before another one is run), and uses icons to identify which of the several programs is active and either running or currently available to run. All of the windows created and displayed on the screen by a particular program form a single stack that can be separately cycled by making predetermined keystrokes. Since there is no provision for subdividing a stack of a program, to find a particular window it may be necessary to cycle through the entire stack. If a user wants to activate a window in a stack of windows from a program other than the one that is currently active, that other program must first be made active and then the windows in the stack associated with that program searched. In MultiFinder, changing from one program to another and thus from one stack to another is accomplished by clicking on a program identifying icon displayed on the screen. This cycles the icons so that the icon for each of the programs being run appears on the screen one at a time. The user clicks on the icons until the icon representing the program that the user wants to run or who's stack the user wants to searched appears on the screen.

In addition to the fact that the above described system operates only for systems running multiple application programs, it further has the disadvantage that it requires that icons be cycled to locate one of several stacks each time that a particular window from a different stack is retrieved. It further requires that in addition to clicking on the icon, keystrokes be used to cycle the windows.

As windowed interfaces have become more widely applied and refined, the concept has been developed of identifying each window with an "object" where the object is defined as a class of data managed by the application. Each distinct class of data is identified by an "object type". In this way, the window system can be viewed as a collection of windows where each window is typed by the object that it displays. For example, in a mail management system the object types may include messages, new messages, composed documents, names, addresses, etc. A number of windows of the same object type can, and frequently will, be displayed on the screen at the same time. When the number of windows on the screen becomes more than a few, some method of quickly and efficiently searching through them is absolutely required if the user is not to become bogged down in going from a window of one object type to a window of another object type, which is often necessary.

The method of the present invention over comes the disadvantages of prior art systems by an elegant and efficient method that permits more direct access to desired information in a windowed system.

SUMMARY OF THE INVENTION

It is therefore an object of the present invention to provide an improved interactive data entry screen method for a windowed user interface permitting multiple windows to be displayed on the screen at the same time.

It is another object of the present invention to provide an improved method for locating particular data from a multiplicity of windows on a computer screen which does not require that icons be cycled.

It is a further object of the present invention to provide a method for quickly and efficiently selecting and cycling through windows in a stack of windows on a computer screen without having to use key strokes.

Yet another object of the present invention is to provide a method of navigating through a stack of windows on a computer screen wherein the ability to alternatively select and display windows containing different data types is accomplished by just a few mouse clicks.

Still another object of the present invention is to provide a method of navigating through a stack of windows on a computer screen which permits the return, by a single mouse click, to an active window after temporarily activating another window.

The method of the present invention operates in a window system environment which has the following facilities:

(a) The window system has a data header associated with each displayed window. The header contains system maintained data about the window as well as application data maintained by the application program.

(b) The window system arranges the data headers for all of the displayed windows in a data structure (typically a stack) linearly ordered by the distance of the window from the foreground display. The window at the "top" of the stack is the one which is in display focus in the foreground. The system provides functions which allow the application program to step through the stack of windows and examine the application data in the header associated with each window. The system also provides functions for the application to ordering of the windows by moving a window to the top or bottom of the stack. This changes the order in which windows are displayed on the screen, as well as decide which window is in display focus.

(c) The window system supports a feature by which an auxiliary window can be permanently displayed in the foreground on top of all the other windows. This window may even overlap the current display focus window (the one on the top of the stack) but all user input is still directed to the window in display focus.

The environment is further determined by the application program itself which must be organized such that each distinct class of data (called an "object") is managed by a sub-program. Each object in turn is uniquely identified as a "type". Multiple instances of the same object type can be displayed simultaneously. Thus, the application program is one that manages a collection of displayed objects of different types.

The functional capabilities of the window system ((a), (b) and (c) above) and the described characteristics and functional capabilities of the application program are mobilized and organized by the present invention to create the method by which navigating through a stack of windows is greatly facilitated.

The feature of (a) above, is used to maintain the value of the object type in the application portion of a window header. This allows the active window to be associated with an object type maintained in its header.

The feature of (c) is used to provide the present invention with a "palette" window which is always in the foreground and therefore always visible. This window contains an icon for each object type that the application program supports. As explained more fully below, the user can select and have quick access to all of the windows of any object type by simply clicking on the corresponding icon in this always visible palette window.

The feature of (b) above which allows the stack of windows to be reordered is used to implement the actual navigation program of the invention. The method of the invention relies on the ability of the system to check the object type for each displayed window.

The application program maintains an Icon Table which contains for each icon, the object type that it represents and the number of windows of that object type that are currently displayed on the screen. The method of the invention is initiated by the user clicking on an icon in the palette window corresponding to the type of data being sought.

In response to an icon being clicked, the window nearest the top of the stack of the object type corresponding to the icon clicked is brought into display focus. Each subsequent time that the same icon is clicked the next window in the stack of the selected object type is brought into display focus. In this way all of the windows of a given object type (and only those windows) can be quickly and easily cycled one at a time for review. Put in another way, clicking an icon creates a sub-stack of all windows of the object type represented by the clicked icon and subsequent clicking on that icon results in cycling through the windows of the sub-stack only.

If the there are no displayed windows of the object type corresponding to the icon clicked, the screen remains unchanged. Similarly, if the only window of the object type corresponding to the icon clicked is already in display focus (on top of the stack), the screen remains unchanged.

If, however, the window in display focus at the time that an icon is clicked is one of two or more displayed windows of the object type corresponding to the icon clicked, then the method of the present invention directs that the window on the top of the stack be rotated to the bottom of the stack and the window of the selected object type then nearest the top of the stack be brought into display focus.

When the icon clicked corresponds to an object type different than that which is then on top of the stack, the window nearest the top of the stack corresponding to the object type selected will be brought to the top of the stack without otherwise altering the order of the stack. As a consequence of this step of the method, the window that was in focus display (on the top of the stack) when an icon of a different type was clicked, will be the window of its object type nearest to the top of the stack. The importance of this feature is best appreciated in the context of actual use.

When a user has a number of windows open on the screen and is working primarily on one window while the others provide resource data, it is desireable, after leaving the main working window to locate needed data, to be able to return to the main window immediately. Except where the working window and the window selected for resource data are of the same object type, this is accomplished in the present invention with a single click on an icon, since the working window will be the window of its type nearest the top of the stack.

BRIEF DESCRIPTION OF THE DRAWINGS

The foregoing and other objects, aspects and advantages of the invention will be better understood form the following detailed description of the preferred embodiment of the invention with reference to the drawings in which:

FIG. 1 is an illustration of a data entry screen where multiple windows are displayed and the icon palette window of the invention is shown;

FIG. 2 is a flow diagram illustrating the operation of the invention, and

FIG. 3 is an alternate flow diagram illustrating the operation of the invention.

DETAILED DESCRIPTION OF THE INVENTION

Referring now to the drawings, and more particularly to FIG. 1, there is shown an example of a data entry screen 10 having a multiplicity of windows 11 displayed. In the typical window system, windows 11 can be displayed but entirely covered by one or more other windows 11 so that the number of different window parts 11a illustrated does not necessarily represent all of the windows 11 displayed.

The screen 10 of FIG. 1, represents a data entry user interface of a window system environment as described above. Accordingly, each displayed window has associated with it a header that contains system maintained data about the window as well as application data maintained by the application program.

The window systems in which the present invention operates are those which arranges the data headers for all of the displayed windows 11 in a data structure (typically a stack 12) linearly ordered by the distance of the window from the foreground display. The window at the "top" of the stack 12 is the one which is in display focus in the foreground. The system provides functions which allow the application program to step through the stack 12 of windows 11 and examine the application data in the header associated with each window. The system also provides functions for the application to order the windows 11 by moving a window to the top or bottom of the stack 12. This changes the order in which windows 11 are displayed on the screen 10, as well as decide which window is in display focus.

Further, the system supports a feature by which a "palette" window 14 can be permanently displayed in the foreground on top of all the other windows 11. This palette window 14 may even overlap the current display focus window 13 but all user input is still directed to the window 13 in display focus.

In addition to the environment created by the window system itself, the present invention operates within the environment provided by an application program presented in the window format. The present invention is designed to operate in those application programs that are organized such that each distinct class of data (called an "object") is managed by a sub-program. Each object in turn is uniquely identified as a "type". Multiple instances of the same object type can be displayed simultaneously. Thus, the application program is one that manages a collection of displayed objects of different types. As part of this management the program maintains a Table that includes the number of windows 11 of each object type that are displayed on the screen 10 at any given time.

In the present invention a number of different icons 16 are displayed simultaneously in the palette window 14 wherein each icon 16 is associated with a different object type. These icons 16 are displayed continuously along with what ever window is in display focus. The palette window 14 can be hidden entirely when, for example, the full screen 10 is needed for data entry, but under normal working conditions the palette window 14 will be displayed at all times.

The present invention permits ready access to individual windows 11 in the stack 12 by interaction with the icons 16. Typically an icon 16 is selected by directing a mouse driven curser (not shown) to the icon 16 and clicking the mouse. Selecting an icon 16 by finger contact in an interactive screen system can produce the same results. It is also possible for the icons 16 to be selected using different key strokes.

Assuming that the window stack 12 has a number of displayed windows 11 of different object types represented by the various icons 16 in the icon palette 14, a user can quickly locate and bring into display focus data in a particular window by knowing only the window's object type. All that the user needs to do is to click on the icon 16 associated with the object type of the data being sought (and this will almost always be immediately obvious). The first click on an icon 16 will produce a result depending on the relationship of the icon 16 selected to the object type of the window in display focus, and the number of windows 11 displayed of the object type associated with the icon 16 selected.

If the icon 16 selected represents an object type for which there is no window displayed, the stack 12 will remain unaltered and the screen 10 will remain as it was.

If the icon 16 selected represents an object type that matches the object type of the window in display focus at the time the icon 16 is selected, and that is the only window of that type in the stack 12, once again the stack 12 will remain unaltered and the screen 10 will remain as it was.

If the icon 16 selected represents an object type that matches the object type of the window in display focus at the time the icon 16 is selected, and there is at least one other window of that object type in the stack 12, the window on the top of the stack 12 will be placed on the bottom of the stack 12 and the window of the object type selected then nearest the top of the stack 12 will be brought to the top of the stack 12. Each subsequent click on that same icon 16 will cause the window on the top of the stack 12 to go to the bottom of the stack 12 and the next window of the object type selected brought to the top of the stack 12. A few clicks on the icon 16 quickly presents each of the windows 11 of the object type of interest until the data being sought is presented the method of the present invention effectively creates a sub-stack of all windows of the selected object type and cycles only through those windows as the icon is subsequently clicked.

If the icon 16 selected is associated with an object type that differs from the object type of a working window in display focus, and there is at least one window of the selected object type in the stack 12, the window nearest the top of the stack 12 that is of the same object type as the icon 16 selected will appear on the top of the stack 12. Subsequent clicks on that same icon 16 will cause the window on the top of the stack 12 to go to the bottom of the stack 12 and the window of that object type next in line in the stack 12 to move to the top of the stack 12. In order to return to the window that was in display focus at the time that the search was instituted, the user need only click once on the icon 16 associated with the object type of that window.

FIG. 2 shows, in flow diagram form, how the method of the present invention can be implemented. The initial steps of the method of the present invention, which are not shown on the flow diagram, are to assign an icon 16 to each different object type being managed by the application program and display those icons 16 in a palette window 14. An icon 16 and its assigned object type are functionally associated such that when an icon 16 is selected the program is told that one of its object types has been selected.

The process of searching through a number of displayed windows 11 is initiated by selecting an icon 16 as indicated by the SELECT ICON block 21.

The selected icon 16 is then matched to its assigned object type as indicated by the ICON/OBJECT TYPE block 22. This step is performed using the information in the program Icon Table which, as previously mentioned, contains for each icon 16, the object type with which it is associated and the number of currently displayed windows 11 of that object type.

The next step is to determine the number of currently displayed windows 11 of the selected object type, as indicated by the NUMBER OF WINDOWS block 23. This step, like the previous one, is performed using the information In the icon 16 Table. There are three possible conditions that the method recognizes: zero; one; and more than one. The next step depends on which of the three possible conditions is found.

If the number of windows 11 is zero, the process is terminated as indicated by the RETURN block 24. The RETURN block 24 represents the program terminating its processing and displaying the screen 10 then active. Thus, if the selected icon 16 is for an object type for which no window is displayed, the screen 10 remains as it was at the time the icon 16 was selected.

One way of visually alerting a user that there are no windows of a particular object type is to have the palette window 14 display each icon 16 in one of two visually distinguishable modes: one when there are no displayed windows of that object type; and, the other when there are. The mode for the no window condition can be to not display the icon at all. Since, however, there is value in having all of the icons displayed at all times (for example, so that a user is reminded of all of the object type possibilities), the no windows mode could be a ghost image of the icon or the like.

If the results of the NUMBER OF WINDOWS step is that there is only one window of the selected object type, the object type of the window on the top of the stack 12 is immediately compared with the selected object type to determine if it is the same or not, as indicated by the COMPARE OBJECT TYPES I block 26.

If the window on the top of the stack 12 is the one window of the selected object type in the stack 12, the process is terminated as indicated by the RETURN block 24. Thus, if the only window of the selected object type is already in display focus, there is no need to change the screen 10. Once again, some visual signal as suggested above, could be provided to alert the user to the fact that selecting the icon 16 will produce no visual result because the one window available is already on the top of the stack 12.

If the results of the COMPARE OBJECT TYPES I step is that the window on the top of the stack 12 is not the same object type as that selected (the one window available is somewhere in the stack 12 below the top), then the next step is to search for the desired window as indicated by the SEARCH block 27. The search is conducted by getting the next window in the stack 12 and examining its object type as indicated by the GET NEXT WINDOW block 28. The object type of this next window is compared with the selected object type to determine if there is a match, as indicated by the MATCH/NO MATCH block 29. When the comparison does not produce a match, the process returns to the GET NEXT WINDOW step and continues thusly until a match is found. In this way the windows 11 are examined (without changing their order) one at a time from the top of the stack 12 down until a window of the selected object type is found.

When a match is found, the window so matching the object type selected is placed on the top of the stack 12 (directly over the window that was on the top of the stack 12 when the search began), as indicated by the TOP OF THE STACK block 31, and the process terminated. The one window of the selected object type in the stack 12 has been found and brought into display focus with a single click.

When THE NUMBER OF WINDOWS step finds that there is more than one window of the selected object type in the stack 12, the process again looks at the window at the top of the stack 12 to see if its object type matches that of the selected object type, as indicated by the COMPARE OBJECT TYPES II block 32. If the object types do not match, then the process is directed to the SEARCH step to locate the window nearest the top of the stack 12 that has the same object type as the object type selected.

If the COMPARE OBJECT TYPES II step shows a match between the object type of the window on the top of the stack 12 and the object type selected, the window on the top of the stack 12 is placed on the bottom of the stack 12, as indicated by the TOP TO BOTTOM block 33, and then the process continues to the SEARCH block 27. In this way the user is able to easily and quickly look at other windows 11 in the stack 12 of the same object type as that currently in display focus.

In its preferred embodiment, the function represented by the TOP OF THE STACK block 31 is performed without otherwise changing the order of the windows 11 in the stack 12. Thus, in all cases except when the object type of the icon 16 selected and the object type of the window on the top of the stack 12 are the same, and there is at least one other window of that object type in the stack 12, the window in display focus when the icon is first selected can be brought back into display focus by a single click on the icon 16 representing its object type, regardless of the number of other windows 11 of that object type in the stack 12.

FIG. 2 is one of several possible flow charts that describes the method of the present invention. The method that constitutes the present invention is, however, independent of the particular flow chart used to describe it, in the same way that the particular computer program instructions that implement the method in any particular application form no part of the invention. FIG. 3, for example is another flow chart that helps to explain the method of the present invention. The flow in both charts although somewhat different, produce results that are identical since it is the same method that is operating in both cases. The invention, therefore, is not limited by the particular flow chart used to help visualize the operation of the method.

It is well within the capability of those skilled in the art to write computer instructions to carry out the steps of the present invention and any number of instruction sets are possible for doing so. Accordingly no such set of instructions is presented herein since the invention is independent of the implementing computer code which forms no part of the invention.

We claim:

1. In a computer interactive data entry system for an application that manages multiple classes of data wherein each class of data is identified as an object type, the data entry system having a windowed user interface which supports a multiple window stack on a computer screen wherein the window at the top of the stack is active to receive user input and wherein each window on the screen is identified with one of the object types, and the stack can contain more than one window identified with the same object type, the method of navigating among the windows comprising the steps of:
   (a) displaying a multiplicity of windows on the screen;
   (b) displaying a plurality of icons simultaneously on the screen, wherein each icon is identified with all of the windows in the stack of one object type, which may be more than one;
   (c) selecting an icon;
   (d) creating a sub-stack of all windows in the stack of the object type identified with the selected icon, wherein the sub-stack may include more than one window;
   (e) displaying on the top of the stack a window of the sub-stack.

2. The method according to claim 1 wherein selection of the icon identified with the window on the top of the stack immediately prior to execution of step (c) returns to the top of the stack the window appearing on the top of the stack immediately prior to execution of step (c).

3. The method of claim 1 wherein step (e) further requires that the window cycled to the top of the stack be that window identified with the selected icon that is nearest the top of the stack.

4. The method according to claim 1, wherein step (e) is preceded by the step of cycling the window on the top of the stack to the bottom of the stack when the window on the top of the stack is identified with the icon selected, and there is more than one window identified with the icon selected in the stack.

5. The method of claim 4 wherein step (c) further requires that the window cycled to the top of the stack be the window identified with the icon selected nearest the top of the stack.

6. The method of claim 5 wherein step (c) further requires that the windows in the stack otherwise remain in the same order.

7. The method of claim 5 wherein the windows identified with one object type are ordered in the stack according to their appearance at the top of the stack.

8. The method of claim 1 wherein the icons are contained within a palette window which when displayed on the screen is always active to receive user input along with the window on the top of the stack.

9. The method of claim 8 wherein the palette window can be selectively hidden.

10. The method of claim 8 wherein each icon has two visually distinguishable display modes; one appearing when, and indicating that, no window identified with that icon is in the stack; and, the other appearing when, and indicating that, at least one window identified with that icon is in the stack.

11. The method of claim 10 wherein each icon has a third distinguishable display mode indicating that the only window identified with that icon is on the top of the stack.

12. The method of claim 10 wherein some form of the icon appears in all modes.

13. In a computer interactive data entry system for an application program that manages multiple classes of data wherein each class of data is identified as an object type, the data entry system having a windowed user interface which supports a multiple window stack on a computer screen wherein the window at the top of the stack is active to receive user input and wherein each window on the screen is identified with one of the object types, and the stack can contain a plurality of windows identified with the same object type, the method of navigating among the windows comprising the steps of:
   (a) displaying a multiplicity of windows on the screen as a stack wherein more than one window identified with the same object type can be in the stack;
   (b) creating a Table that contains all of the object types managed by the application and the number of windows of each object type in the window stack on the screen;
   (c) displaying a plurality of icons on the screen, wherein each icon is identified with all of the windows of one of the object types, which may be more than one window;
   (d) selecting an icon;
   (e) checking the Table to determine if a window of the object type identified with the selected icon is in the stack of windows on the screen;
     (e1) if no window identified with the selected icon is found in the Table the method is terminated;
     (e2) if only one window identified with the selected icon is found in the Table and that window is on the top of the stack, the method is terminated;
     (e3) if only one window identified with the selected icon is found in the Table and that window is not on the top of the stack, it is moved to the top of the stack;
     (e4) if more than one window identified with the selected icon is found in the Table the window identified with the selected icon closest to the top of the stack, but not at the top of the stack, is moved to the top of the stack.

14. The method according to claim 13 wherein a single click of the icon identified with the window on the top of the stack prior to execution of step (d) returns to the top of the stack the window on the top of the stack prior to execution of step (d).

15. The method of claim 13 wherein step (e4) further requires that the window cycled to the top of the stack be the window identified with the selected icon nearest the top of the stack.

16. The method according to claim 13, wherein step (e4) is preceded by the step of cycling the window on the top of the stack to the bottom of the stack when the window on the top of the stack is identified with the selected icon.

17. The method of claim 16 wherein step (e4) further requires that the window cycled to the top of the stack be the window identified with the selected icon nearest the top of the stack.

18. The method of claim 17 wherein step (e4) further requires that the windows in the stack otherwise remain in the same order.

19. The method of claim 18 wherein the windows are ordered in the stack according to their appearance at the top of the stack.

20. The method of claim 13 wherein the icons are contained within a palette window which when displayed on the screen is always active to receive user input along with the window on the top of the stack.

21. The method of claim 20 wherein the palette window is selectively extinguishable.

22. The method of claim 20 wherein each icon has two visually distinguishable display modes; one appearing when, and indicating that, no window identified with that icon is in the stack; and, the other appearing when, and indicating that, at least one window identified with that icon is in the stack.

23. The method of claim 22 wherein each icon has a third distinguishable display mode indicating that the only window identified with that icon is on the top of the stack.

24. The method of claim 22 wherein some form of the icon appears in all modes.

* * * * *

UNITED STATES PATENT AND TRADEMARK OFFICE
CERTIFICATE OF CORRECTION

PATENT NO.    : 5,430,839
DATED         : July, 4, 1995
INVENTOR(S)   : Anand Jagannathan, Joy Chhugani It is certified that error appears in the above-indentified patent and that said Letters Patent is hereby corrected as shown below:

At col. 10, line 1, "(c)" should read --(e)--.

Signed and Sealed this

Twenty-fourth Day of October, 1995

Attest:

BRUCE LEHMAN

*Attesting Officer*     *Commissioner of Patents and Trademarks*